INVENTOR.
John G. Kay.
BY
Balluff and McKinley
ATTORNEYS.

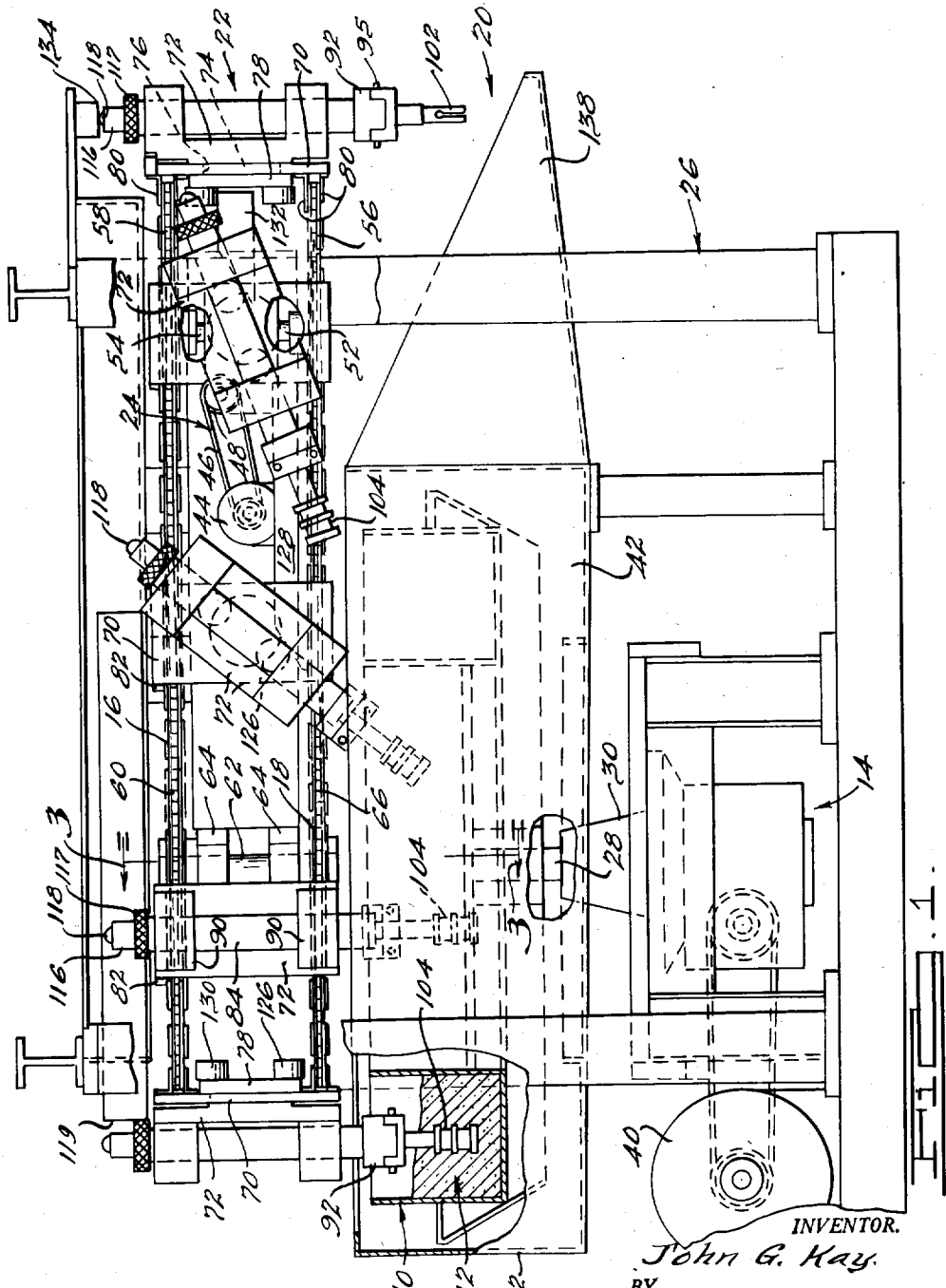

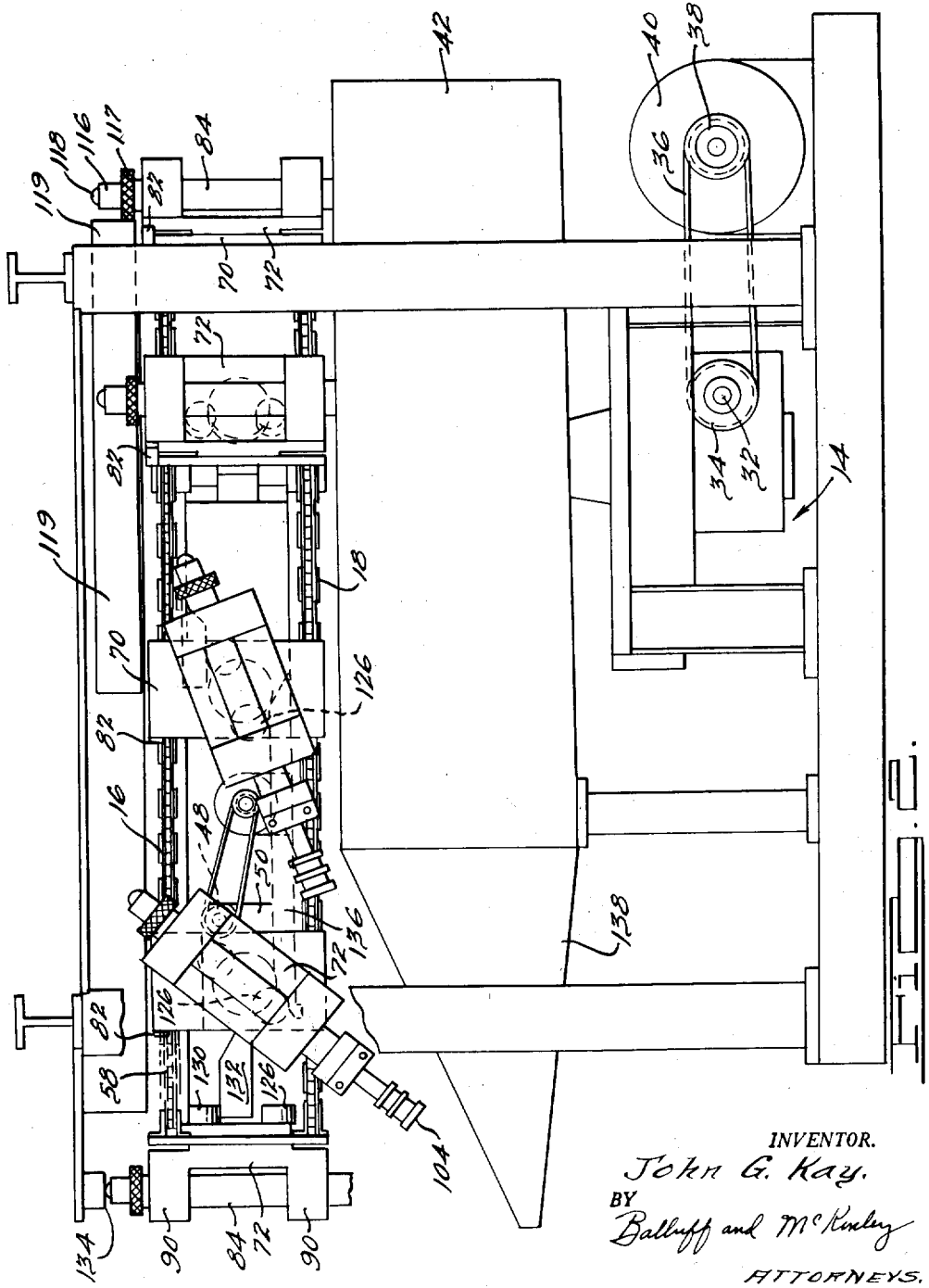

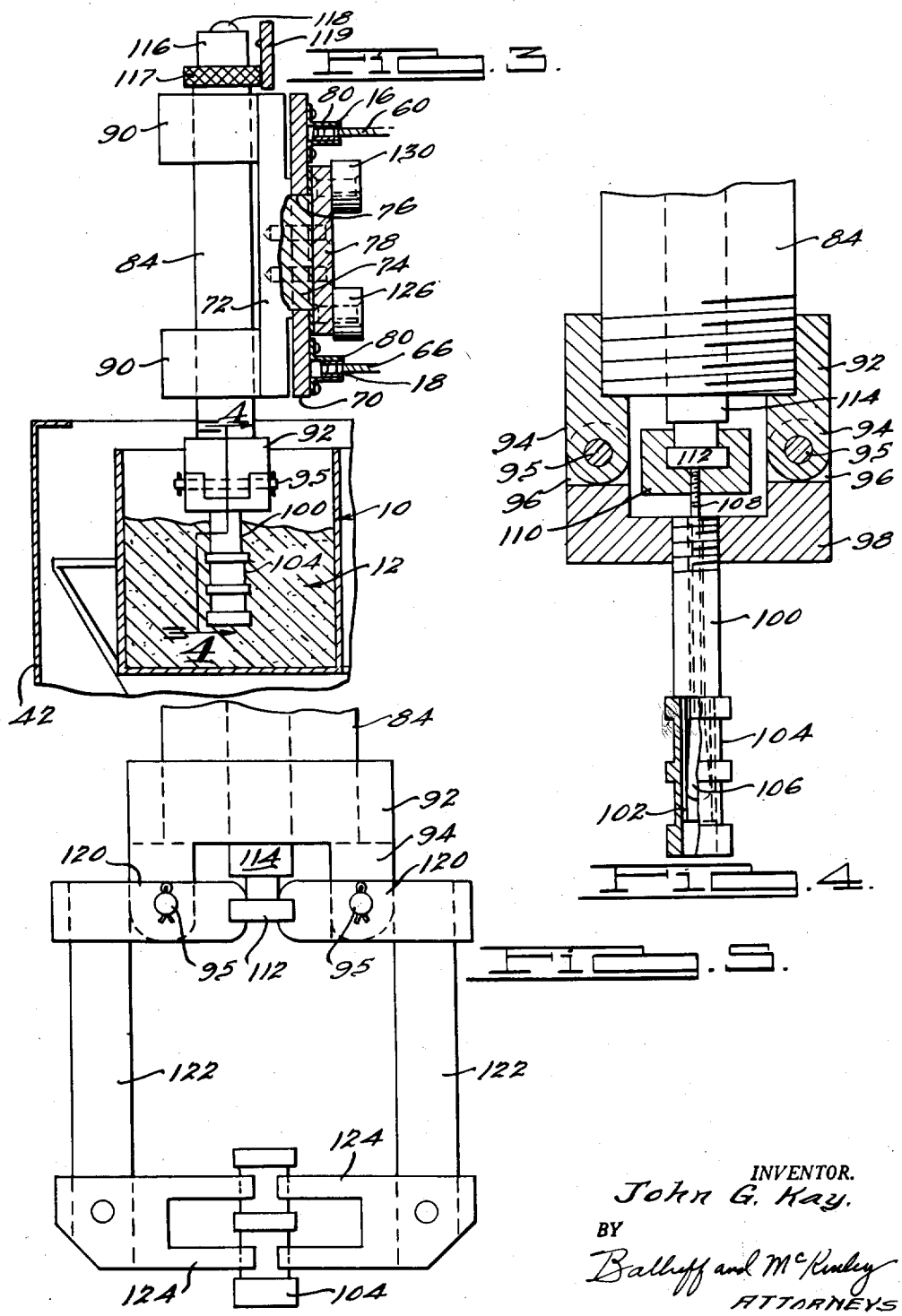

United States Patent Office 2,921,413
Patented Jan. 19, 1960

2,921,413

ROTARY MACHINE FOR PROCESSING WORKPIECES

John G. Kay, Detroit, Mich., assignor to F. Jos. Lamb Co., Warren, Mich., a corporation of Michigan Application March 11, 1959, Serial No. 798,766

9 Claims. (Cl. 51—7)

This invention relates to rotary machines for processing workpieces, and has particular reference to such a machine for removing burrs and rough edges from workpieces and putting a smooth finish thereon.

Deburring of machined parts as conventionally carried out is an expensive and slow operation. This invention relates to a machine which will efficiently remove burrs from machined parts and which in addition may be used to obtain a relatively fine smooth finish on such parts.

An object of the invention, therefore, is to provide a new and improved rotary machine for processing workpieces by circulating the same through a rotary trough containing a mass of work processing material.

Another object of the invention is to provide such a machine with a series of rotating work holding carriers which are circulated through a mass of work processing material in a rotary trough and then through a loading station where work to be processed may be loaded onto such carriers and processed work removed therefrom.

Other and further objects of the invention will be apparent from the following description and claims and may be understood by reference to the accompanying drawings, of which there are four sheets, which by way of illustration show preferred embodiments of the invention and what I now consider to be the best mode of applying the principles thereof. Other embodiments of the invention may be used without departing from the scope of the present invention as set forth in the appended claims.

In the drawings:

Figure 1 is a side elevational view, with parts broken away, of a machine embodying the invention;

Figure 2 is an elevational view of the opposite side of such machine;

Figure 3 is an enlarged fragmentary sectional view taken along the line 3—3 of Figure 1;

Figure 4 is a fragmentary sectional view taken generally along the line 4—4 of Figure 3;

Figure 5 is a fragmentary view illustrating a modified form of work holding means;

Figure 6:
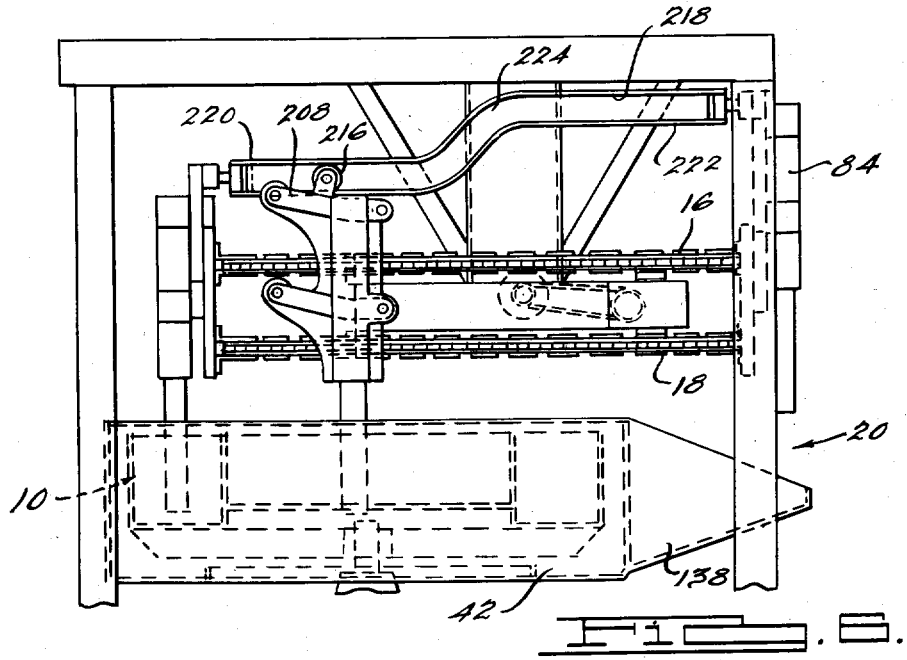
Figure 6 is an elevational view of a modified form of the invention.

As illustrated in Figures 1 and 2, a machine embodying the invention comprises in general a horizontally disposed rotary trough 10 adapted to contain a slurry of work processing material 12, a motor operated unit 14 for rotating the trough 10, a pair of horizontally disposed parallel endless chains 16 and 18 supported for movement above the trough 10 and a loading station 20, a series of work holding carriers 22 carried by the chains 16 and 18 so as to move therewith, a motor drive unit 24 for driving said chains 16 and 18 so as to effect the circulation of said carriers over said trough and through the loading station 20, and a frame 26 upon which the various parts of the machine are mounted.

The annular trough 10 is supported on the upper end of the vertical output shaft 28 which projects upwardly from the housing 30 of the power transmission unit 14. The unit 14 is mounted at the bottom of the machine and includes an input shaft 32 carrying a pulley 34 which is connected by a drive belt 36 with the pulley 38 of an electric motor 40. The arrangement is such that the motor driven unit 14 rotates the trough 10 at a speed of about 22 revolutions per minute, thus moving the work processing material or slurry 12 therein at a speed of about 600 feet per minute. The trough 10 may be driven through a wide range of speed, depending upon the operation being performed on the workpiece, the type of work processing material employed, and the speed at which the carriers 22 are circulated. For deburring and finishing operations on metal workpieces, the processing material may comprise an abrasive slurry.

A stationary shroud 42 encloses the outside and the bottom of the trough 10. The chain driving unit 24 includes a motor 44 connected by a drive belt 46 to a pulley 48 on the input shaft of a power transmission 50 having vertically extending upper and lower output shafts 52 and 54 projecting therefrom, the shaft 52 having a sprocket 56 mounted thereon and the shaft 54 having a sprocket 58 mounted thereon. The upper chain 16 passes over the sprocket 58 and is driven thereby, the other end of such chain passing over a sprocket 60 mounted on the upper end of a vertical shaft 62 which in turn is journaled in the bearings 64. The chain 16 is supported by the sprockets 58 and 60 over the teeth of which the chain 16 passes so as to be driven thereby. The lower chain 18 is supported at one end by its engagement with the teeth of the sprocket 56 and at the other end by engagement with the teeth of a sprocket 66 mounted on the lower end of the shaft 62. The chains 16 and 18 are disposed in parallel and at one end overlie the inner periphery of the annular trough 10 throughout the half thereof disposed on the left side in Figure 1.

Each of the work holding carriers 22 comprises a plate 70 connected to the upper and lower chains 16 and 18, a body 72 having a circular portion 74 journaled in a circular opening 76 in the plate 70, and a disc 78 bolted to the portion 74 for retaining the circular portion 74 of the body 72 in the circular opening 76 in the plate 70, thereby to rotatably support the body 72 on the plate 70. The plate 70 at its upper and lower ends is secured to brackets 80 on the chains 16 and 18 so as to be supported thereby and moved therewith. Each of the plates 70 is provided with a lug 82 forming a stop for limiting the counterclockwise rotation of the body 72 relative to the plate 70 and so as to locate the spindle of the work holder in a vertical position during part of the travel of the work holding carrier 22 above the trough 10.

The work holding carrier 22 further includes a sleeve or spindle 84 journaled in bearings provided by upper and lower bearing caps 90 on the body member 72. The lower end of the sleeve depends from the body 72 and has threadedly secured thereto a collar 92 having downwardly projecting lugs 94. Each of the lugs 94 is straddled by bifurcations 96 of a member 98 having a tubular shank 100 depending therefrom. Pins 95 interconnect the parts 94 and 96. The reduced lower end of the shank 100 is axially split and formed so as to provide a plurality of annularly arranged spring fingers 102 which are inserted in the central portion of the spool valve member 104 which is to be processed. A tapered frusto-conical wedge 106 disposed within the fingers 102 cooperates therewith for expanding the same so as to grip the inner bore of the spool valve member 104 and thereby retain the same in position on the lower end of the shank 100. The wedge 106 is provided on the lower end of a rod 108 which is threadedly secured to a coupling member 110 which in turn is connected to the head 112 of the lower end of a rod 114 which projects upwardly through the sleeve 84. A spring (not shown) within the sleeve 84 biases the rod 114 upwardly so that the fingers 102 normally are in clamping position. The upper end of the rod 114 projects above the sleeve 84. A cap 116 mounted on the upper end of the sleeve 84 supports and positions a ball 118 against which the upper end of the rod 114 reacts whereby downward thrust may be exerted on the rod 114 for moving the wedge 106 downwardly relative to the fingers 102 so as to permit the fingers 102 to contract and release the grip on the workpiece 104. A knurled roller 117 fixed to sleeve 84 may run on track 119 for rotating sleeve 84 and the workpiece 104 when the latter is in the slurry 12.

In lieu of the work holding means just described, the modified construction illustrated in Figure 5 may be employed. In this modification instead of using the member 98, a pair of arms 120 are pivoted by the pins 95 to the lugs 94, the inner ends of the arms 120 being slotted to accommodate the head 112 on the lower end of the rod 114 so that as the head 112 moves up and down, the arms 120 will pivot about the pins 95. Each of the arms 120 is provided with a downwardly extending arm 122, the lower end of which is fixed to an inwardly extending bifurcated work holding member 124. Each of the members 124 is formed at its ends so as to receive a workpiece, such as the valve member 104, whereby the members 124 in the position as illustrated in Figure 5 are adapted to engage and clamp the exterior of a workpiece 104. It will be evident that when the head 112 of the rod 114 moves downwardly, the members 124 will retract and release the piece 104.

In order to immerse a piece 104 to be processed in the slurry 12, the work holding means which includes the body 72 and the parts carried thereby must be vertically disposed as each carrier moves through the right half of the trough shown in Figure 2. I contemplate that the chains 16 and 18 will circulate in the same direction as the direction of rotation of the trough 10 but will move at a slower speed. Thus the pieces 104 being processed will move countercurrent relative to the slurry 12 in the trough 10, thus tending to turn the body 72 of the work holding means counterclockwise, looking at Figure 2. The stop 82 on the plate 70 cooperates with the edge of the body 72 to locate the same so that the sleeve 84 of the work holding means is vertically disposed.

In order to move the workpiece 104 out of the trough 10, the same must be elevated above the side edges thereof, and this is done by rocking the work holding means which is possible because of the rotary connection between the body 72 and the plate 70. As the carriers move to the right, looking at Figure 1, the roller 126 on the disc 78 engages the cam-shaped end of a guide 128 as shown in Figure 1, causing the body 72 to rock in a clockwise direction so that the workpiece 104 will clear the trough 10 and the shroud 42. The guide 128 extends to the right sufficiently to hold the body 72 in a tilted position until the workpiece 104 clears the right-hand end of the shroud 42. After the roller 126 passes off of the upper surface of the guide 128, the upper roller 130 on the disc 78 engages the wedge-shaped end of another guide 132 which reacts on the roller 130 so as to rock the body 72 in a counter-clockwise direction until the body 72 engages the stop 82, thus returning the body 72 and the parts carried thereby to a vertical position. As this occurs, the carrier 22 whose body 72 has just been righted, approaches the loading station 20 where the ball 118 comes into engagement with a cam track 134 which depresses the ball 118 and the rod 114 for releasing the work clamping means as previously described. The work clamping means including the resilient fingers 102 thereof is thus moved to its disengaged position, thus permitting the workpiece 104 to be removed. After a processed piece of work 104 has been removed from the work holding means while in the loading station, a piece to be processed is mounted on the work holding means.

The cam track 134 is of relatively short length and just as soon as the carrier in question moves past the same, the ball 118 wil be free to return to its normal position, thus permitting the clamping means to securely clamp the piece of work to be processed to the lower end of the shank 100 for travel through the slurry 12 in the trough 10. However, in order to get into the slurry in the trough 10 the work holding means must again be rocked as shown in Figure 2 to clear the edge of the shroud 42 and the tank 10, and this is accomplished by another guide 136, the tapered or cammed end of which cooperates with the lower roller 126 to rock the body 72 in a clockwise direction. After the roller 126 passes the guide 136, the body 72 will pivot in a counterclockwise direction due to the weight of the lower end thereof and of the piece 104, thus lowering the workpiece 104 into the material 12 in the trough 10; and, as the trough 10 is moving faster than the chains 16 and 18, the reaction between the faster moving slurry and the workpiece 104 will return the body member 72 to its vertical position. Cam 137 cooperates with roller 130 to retard the righting of the spindle 84 in response to the reaction between the fast moving slurry 12 and the workpiece 104.

In its movement through the slurry in the right-hand end of the trough, looking at Figure 2, the slurry will serve to deburr the piece 104 and, depending upon the fineness of the slurry, will finish or polish the exposed surfaces of the workpiece 104.

When the carrier in question reaches the opposite side of the machine where the roller 126 engages the end of the guide 128, the body 72 will be rocked so as to remove the workpiece from the slurry, as previously described.

An apron 138 projects laterally from the shroud 42 beneath the path of the workpieces outside of the trough and forms a means for collecting any of the slurry which may drip or fall from the workpieces 104. It will be evident that the amount of deburring which is done on the workpiece 104 may be controlled by the length of time that the workpiece is in the slurry and the relative speed between the workpiece and the slurry. Hence the chains 16 and 18 may be driven and the trough 10 may be rotated at any speed which will provide the desired finishing operation. Of course the consistency and nature of the slurry will to some extent determine the nature and extent of the processing carried out upon the pieces 104.

Figure 7:
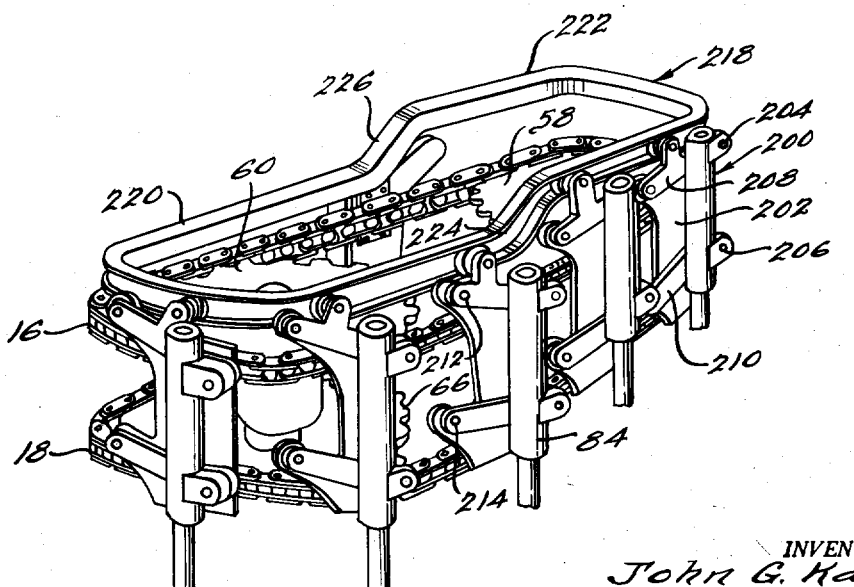
Figure 7 is a fragmentary perspective view of the work holding carrier supporting and circulating means of the modification illustrated in Figure 6.

In the modified arrangement shown in Figures 6 and 7 the construction is essentially the same except for the work holding carriers. As in the previous modification, a series of work holding carriers 200 are mounted upon upper and lower chains 16 and 18 driven and supported by sprockets 58, 56, 60 and 66 and are moved in an endless path over the rotary trough 10 and the loading station 20. Each of the carriers 200 comprises a plate 202 fastened to the upper and lower chains 16 and 18 so as to move therewith. However, in this modification the tubular member 84 is pivoted at 204 and 206 to arms 208 and 210 respectively, which in turn are pivoted at 212 and 214 to the plate 202 whereby the tubular member 84 is supported for vertical movement with reference to the plate 200. Each arm 208 carries a roller 216 which runs in a track or guide 218 which extends continuously around the machine above the upper chain 16. The track 218 includes a lower portion 220 which is disposed above the trough 10 and a higher portion 222 which is disposed above the loading station 20, such portions being interconnected by curved portions 224 and 226. As the roller 216 moves from the lower portion 220 through the curved portion 224 to the upper portion 222, the roller 216 will cause the arm 208 to pivot upwardly, thereby elevating the tubular member 84 so that the work thereon will clear the edge of the trough 10 and the shroud 42. After a work holder passes the loading station 20, the portion 226 of the track 218 will effect the lowering of the tubular member 84 so as to insert the workpiece carried thereby into the slurry in the trough 10.

The carriers 200 are provided with work holding means, releasing means, and rotating means therefor as shown in the previous modification.

While I have illustrated and described preferred embodiments of my invention, it is understood that these are capable of modification, and I therefore do not wish to be limited to the precise details set forth but desire to avail myself of such changes and alterations as fall within the purview of the following claims.

I claim:

1. A rotary machine for processing work comprising a rotary horizontally disposed annular trough adapted to contain a mass of work processing material, means for rotating said trough, a loading station at one side of said trough, a horizontally disposed endless chain supported for movement above said trough and station, a series of carriers connected with said chain so as to move therewith, power means for driving said chain so as to effect the circulation of said carriers over said trough and through said station, each of said carriers including shiftable work holding means adapted to hold a workpiece and in one position thereof to move such workpiece through the material in said trough as said carriers are circulated by said chain, means cooperable with each of said work holding means for shifting the same to a second position to elevate the workpiece thereon out of said processing material as the carrier in its movement approaches the loading station, said work holding means including clamping means for engaging and holding the workpiece thereon, and means disposed to react on said clamping means as it moves into said loading station for releasing the same at said loading station.

2. A rotary machine for processing work comprising a rotary horizontally disposed trough adapted to contain a mass of work processing material, means for rotating said trough, a loading station at one side of said trough, a pair of parallel horizontally disposed endless chains supported for movement above said trough and station, a series of carriers carried by said chains so as to move therewith, power means for driving said chains so as to effect the circulation of said carriers over said trough and through said station, each of said carriers including work holding means adapted to hold a workpiece and in one position to move such workpiece through the material in said trough as said carriers are circulated by said chains, a continuous track above said chains, and means on said work holding means cooperable with said track for shifting said work holding means to another position so as to elevate the workpiece thereon out of said processing material as the carrier in its movement approaches the loading station.

3. A rotary machine for processing work comprising a rotary horizontally disposed trough adapted to contain a mass of work processing material, means for rotating said trough, a loading station at one side of said trough, a pair of parallel horizontally disposed endless chains supported for movement above said trough and station, a series of carriers connected with said chains so as to move therewith, power means for driving said chains so as to effect the circulation of said carriers over said trough and through said station, each of said carriers including a plate connected to said chains, a body rotatable on said plate, and work holding means depending from said body for holding a workpiece for movement through the material in said trough, means cooperable with said body for rotating the same to elevate the workpiece thereon above said trough as said carrier moves away from said trough toward said loading station and from said loading station toward said trough.

4. A rotary machine for processing work comprising a rotary horizontally disposed trough adapted to contain a mass of work processing material, means for rotating said trough, a loading station at one side of said trough, a pair of parallel horizontally disposed endless chains supported for movement above said trough and station, a series of carriers carried by said chains so as to move therewith, power means for driving said chains so as to effect the circulation of said carriers over said trough and through said station, each of said carriers including work holding means adapted to hold a workpiece and in one position to move such workpiece through the material in said trough as said carriers are circulated by said chains, means cooperable with each of said work holding means for shifting the same to another position so as to elevate the workpiece thereon out of said processing material as the carrier in its movement approaches the loading station.

5. A rotary machine according to claim 4 wherein said work holding means include clamping means for engaging and holding the workpiece thereon, and means reacting on said clamping means as it moves into said loading station for releasing the same at said loading station.

6. A rotary machine for processing work comprising a rotary horizontally disposed trough adapted to contain a mass of work processing material, means for rotating said trough, a loading station at one side of said trough, a pair of parallel horizontally disposed endless chains supported for movement above said trough and station, a series of carriers carried by said chains so as to move therewith, power means for driving said chains so as to effect the circulation of said carriers over said trough and through said station, each of said carriers including work holding means adapted to hold a workpiece and in one position to move such workpiece through the material in said trough as said carriers are circulated by said chains, and means cooperable with each of said work holding means for shifting the same to another position so as to elevate the workpiece thereon out of said processing material as the carrier in its movement approaches the loading station.

7. A rotary machine according to claim 6 wherein said work holding means are pivotally mounted on said carriers.

8. A rotary machine according to claim 6 wherein a pair of arms pivotally mount said work holding means for pivotal movement on said carriers.

9. A rotary machine according to claim 6 including provisions for rotating said work holding means and the workpiece carried thereby as the workpiece is moved through the material in said trough.

References Cited in the file of this patent

UNITED STATES PATENTS

| | | |
|---|---|---|
| 886,097 | Vaudreuil | Apr. 28, 1908 |
| 2,344,475 | Turnbull | Mar. 14, 1944 |
| 2,554,701 | Hackett | May 29, 1951 |
| 2,589,782 | Creek | Mar. 18, 1952 |
| 2,803,093 | Diehl et al. | Aug. 20, 1957 |